Patented Apr. 13, 1937

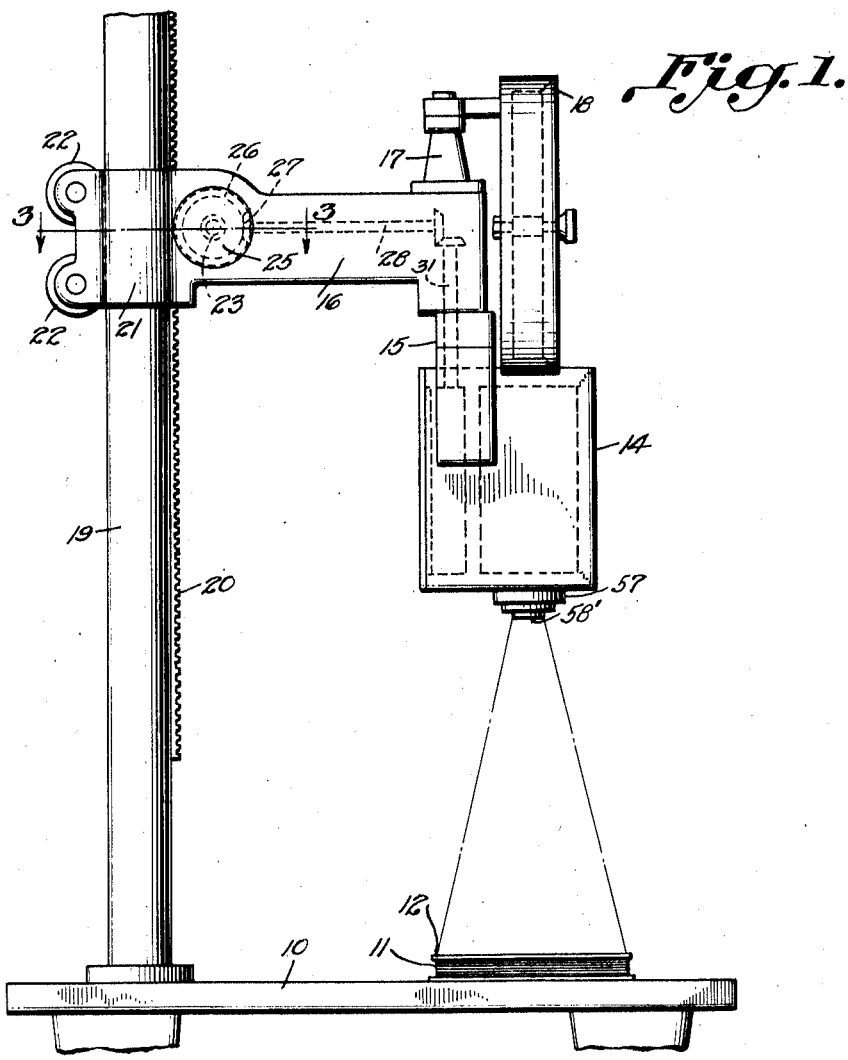

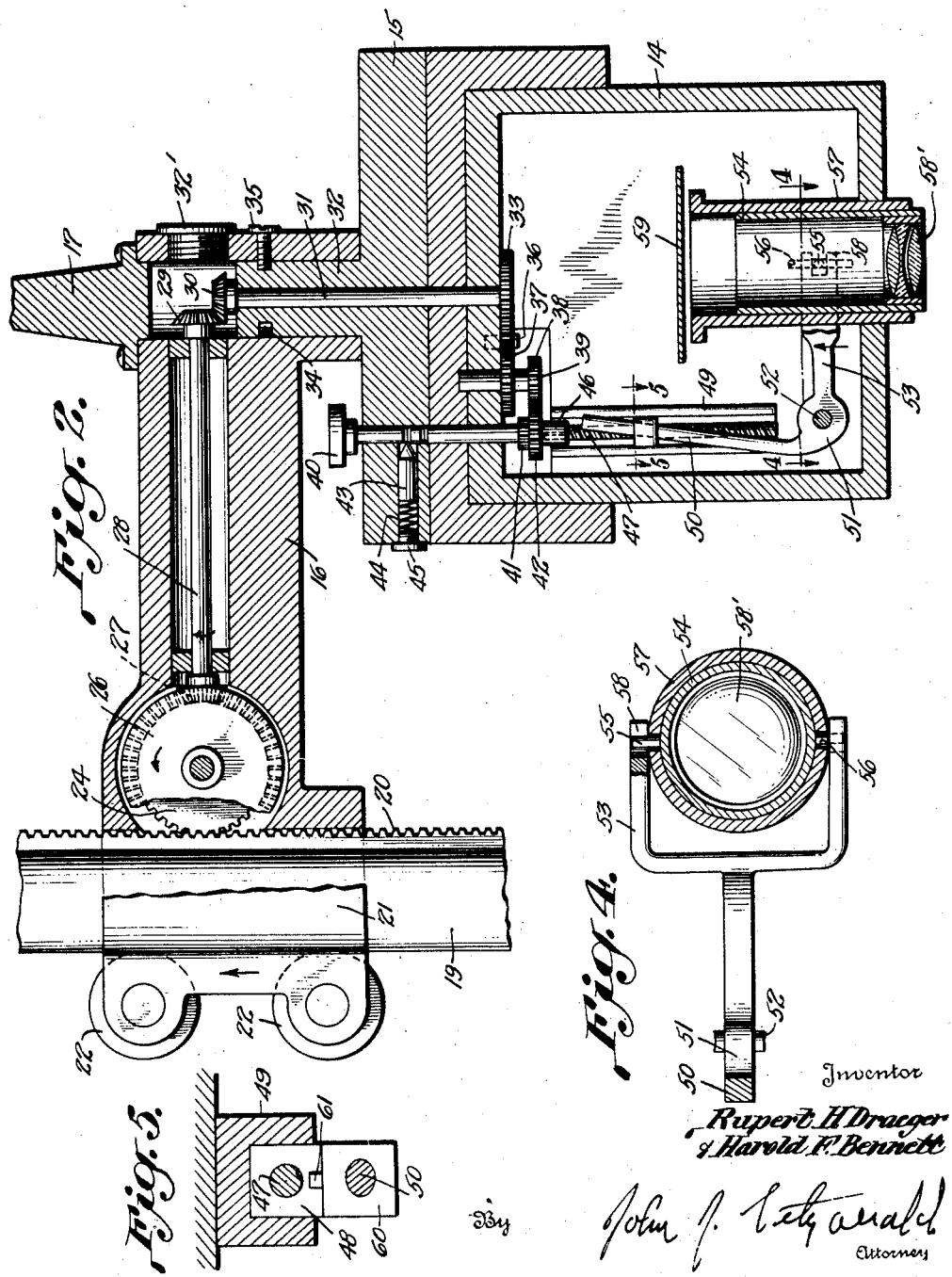

2,076,552

UNITED STATES PATENT OFFICE 2,076,552

AUTOMATIC FOCUSING DEVICE FOR COPYING CAMERAS, PROJECTORS, AND THE LIKE

Rupert H. Draeger, U. S. Navy, and Harold F. Bennett, Washington, D. C.

Application May 9, 1935, Serial No. 20,611

8 Claims. (Cl. 88—24)

(Granted under the act of March 3, 1883, as amended April 30, 1928; 370 O. G. 757)

This invention relates to an automatic focusing device especially intended for use on a copying camera or projector or other apparatus wherein the distance may be varied between an object and the image projected by the lens and wherein it is desired to maintain the image continuously in proper focus as the size of the image is varied.

More particularly, this invention is intended to be used on a copying camera, or an enlarging camera, which is mounted for relative movement on a support and wherein an object which is to be copied or photographed by the camera may be of any size between finite limits, the object being located at the base or end of the support. With this invention the lens of the camera will automatically be kept in properly focused relation to the object being copied or photographed and the photo-sensitive surface as the camera is moved back or forth relative to the object so that the camera may be placed at a proper distance from the object to permit the entire object to be photographed on the film or paper being used. In copying books, for instance, the size of the page being copied will vary according to the size of the books, thus, some books which are small or pocket size and other books which are large, such as unabridged dictionaries, encyclopedias and the like all may be accommodated. In photographing a larger object a larger image would be focused on the film or photographic paper. To cause the image to be properly confined on the film or photographic paper it is therefore necessary to move the camera relative to the object being photographed. As the camera is moved to bring the image to the desired size the focus must be progressively changed; otherwise, the image will not be focused properly on the film or photographic paper. This feature is particularly advantageous when photographing to a definite scale or size.

The motion of the lens relative to the camera is not in constant ratio to the motion of the camera relative to the object to be photographed, but when the camera is nearer the object the lens not only is farther from the film but also has a more rapid motion relative to the movement of the camera in accordance with optical laws well known in the art.

This type of motion is obtained by means of a gear train and a slide arm offset from its pivot point and constituting part of a lever of which the other arm transmits the motion to the lens draw tube.

With this invention the act of changing the distance from the camera to the object to be photographed automatically and simultaneously changes the distance between the lens and the photographic film or paper. For certain purposes it may be desirable to substitute a lens having a different focal length. To permit this, the gear train is provided with a gear shift mechanism so as to provide a predetermined ratio of movement in the gear train to properly compensate for the new lens of the different focal length. Obviously, any part of the gear train may be changed to provide for different lenses of different focal lengths, but one feature of this invention is the provision of a gear shift built into the gear train, permitting use of lenses for two predetermined focal lengths, but a gear shift may be provided permitting any desired number of different lenses.

With the foregoing and other objects in view, as will hereinafter become apparent, this invention comprises a combination and construction hereinafter disclosed, claimed and illustrated on the accompanying drawings, wherein:

Fig. 1 is a side elevation view of a copying camera to which this invention has been applied;

Fig. 2 is an enlarged sectional view through the camera supporting arm and camera case, the camera having been rotated at 90° relative to the showing in Fig. 1;

Fig. 3 is a sectional view on line 3—3 of Fig. 1;

Fig. 4 is a sectional view on line 4—4 of Fig. 2; and

Fig. 5 is a view of the connection between the screw and lever taken on line 5—5 of Fig. 2.

There is shown at 10 a table or surface on which an object 11 such as a book, held open by flat glass 12, is placed for being photographed or copied by the camera 14. This camera 14 is secured in a yoke 15 depending from a supporting arm 16. The supporting arm 16 also carries a film magazine 18 for supplying film in a conventional manner to the camera 14. The pedestal 17 carries a clamp for holding magazine to camera case 14. Extending from the table 10 is a support rod 19, a gear rack 20 being formed in one side thereof. The supporting arm 16 is provided with a bifurcated end 21 through which extends the thumb screws 22, the bifurcated end 21 encompassing the support rod 19. By loosening the thumb screws 22 the supporting arm 16 may be moved to any position along the length of the support rod 19, and held there by tightening the thumb screws 22. Journaled within the supporting arm 16 is a shaft 23 on which is keyed a spur gear 24 enmeshed with the gear rack 20.

A door 25 in one side of the supporting arm 16 permits access to this gear 24 for assembly purposes. Keyed to the shaft 23 is a bevel gear 26 which will partake of the rotation of the spur gear 24. Meshing with this bevel gear 26 is a bevel gear 27 keyed to one end of a shaft 28 extending through the support arm 16. The other end of the shaft 28 is provided with a miter gear 29 enmeshing with another miter gear 30 keyed on the end of a shaft 31. Access to the miter gears 29 and 30 may be had when necessary through the plug 32'. The shaft 31 is journaled through the stem 32 of the yoke 15 and terminated in a spur gear 33 within the camera 14. The yoke 15 is held to the supporting arm 16 by means of a slot 34 extending at least 90° or more about the stem 32 and a set screw 35 extending through the end of the supporting arm 16 into the slot 34, holds the yoke 15 and camera 14 in proper relation to the supporting arm 16 but permits such rotation of the camera as may be desired. The spur gear 33 meshes with an idler gear 36 which, in turn, meshes with a spur gear 37 keyed on a shaft 38, another but smaller gear 39 being likewise keyed on this same shaft 38.

Extending through the yoke 15 is a gear shift arm 40 which is provided with two spur gears 41 and 42. The larger spur gear 42 in one position adapted to mesh with the spur gear 39 or when in shifted position the smaller spur gear 41 being adapted to mesh with the larger spur gear 37 on shaft 38, thus providing for a change in the gear ratio. Obviously, provision might be made for additional gear changes by providing additional gears. A spring pressed plunger 43 and spring 44, held in position by plug 45, serves to hold the gear shift arm 40 in either of its shifted positions. The lower end of this gear arm 40 is provided with keyed sleeve 46 into which extends upper splined end of a screw 47. Threaded on the screw 47 is a nut 48 which is held against rotation by means of the ways 49. As the nut 48 is caused to travel up or down the screw 47, it moves an arm 50 of lever 51 which is fulcrumed on the shaft 52 in the camera 14. This arm 50 is, in effect, a straight cam but may be offset from fulcrum 52 as shown, and as the arm 50 moves lever 51 about its fulcrum 52 it causes its other arm 53 to move the lens draw tube 54 by means of a pin 55 extending through slot 56 in the lens barrel 57, the arm 53 ending in bifurcations 58 encompassing the pin 55.

The ratio of the gear train between the gear rack 20 and the movement of the lens draw tube 54 is so chosen that as the supporting arm 16 is moved up or down the supporting rod 19, the lens draw tube 54 will be moved in the same direction up or down but in a proper modified ratio so that the lens 58 will be at the proper focal distance between the object 11 and the photographic film or paper 59. When a lens of a different focal length is substituted for the lens 58', the gear shift 40 is operated so as to disengage the spur gears 42 and 39 and engage the spur gears 41 and 37. Obviously, if a lens of yet a different focal length is to replace the lens 58', then a different size gear may be substituted somewhere along the gear train. The arm 50 of the lever 51 slidably engages the nut 48 by passing through a shaftway 60, pivoted as at 61 to the nut 48, any other equivalent mechanical means being serviceable for this purpose.

In operation the camera 14 and supporting arm 16 will be moved along the rod 19 so as to be at the proper distance from the object 11 or book being copied. If a different sized book or object of a different size is substituted for the object 11, it will be necessary to move the camera 14 relative thereto so as to cause the proper size image to be focused on the film 59. As the camera is thus moved the gear train from the rack 20 to the lens tube 54 operates automatically to maintain the lens 58 in substantially proper focus between the new object and the photographic film or paper 59.

In practice it is frequently desirable and advantageous to make the first copy or negative merely a miniature and subsequently with the same, or similar, apparatus, reproduce this picture in any desirable size or sizes. However, the negative may be of any size relative to its original, and the subsequent copies may be of any size relative to the negative.

The invention described herein may be manufactured and used by or for the Government of the United States of America for governmental purposes without the payment of any royalties thereon or therefor.

What is claimed is:

1. An automatic focusing device for a camera comprising an arm for supporting the camera, means securing the camera to said supporting arm, a support rod, said arm being slidably securable along said support rod, a gear rack on said support rod, a lens draw tube movably mounted in said camera, and a gear train, one end of said gear train being in mesh with said support rod gear rack and the other end of said gear train being so connected as to impart modified movement to said lens tube relative to the camera, said gear train passing through the rotatable connection between the camera and the supporting arm.

2. An automatic focusing device for a camera comprising an arm for supporting the camera, a support rod, said arm being slidably securable along said support rod, a gear rack on said support rod, a lens draw tube movably mounted in said camera, and a gear train, one end of said gear train being in mesh with said support rod gear rack and the other end of said gear train being so connected as to impart modified movement to said lens tube relative to the camera, said camera being rotatably secured to said supporting arm by a stem extending from a yoke, said stem having a hole extending therethrough and means extending through said hole, connecting portions of the gear train.

3. An automatic focusing device for a camera comprising an arm for supporting the copying camera, a support rod, said arm being slidably securable along said support rod, a gear rack on said support rod, a lens draw tube movably mounted in said camera, and a gear train, one end of said gear train being in mesh with said support rod gear rack and the other end of said gear train being so connected as to impart modified movement to said lens tube relative to the camera, gear shift means in said gear train for changing the ratio of movement of the lens draw tube to the movement of the supporting arm on the supporting rod to permit substitution of a lens of different focal length.

4. An automatic focusing device for a camera comprising an arm for supporting the copying camera, a support rod, said arm being slidably securable along said support rod, a gear rack on said support rod, a lens draw tube movably mounted in said camera, and a gear train, one end of said gear train being in mesh with said support rod gear rack and the other end of said gear train being so connected as to impart modified movement to said lens tube relative to the camera, said gear train including a screw rotatable thereby, a lever fulcrumed in the camera case, one arm of the lever being connected to the lens draw tube and the other arm of the lever being engaged by a nut movable by rotation of said gear train screw.

5. An automatic focusing device for a camera comprising an arm for supporting the copying camera, a support rod, said arm being slidably securable along said support rod, a gear rack on said support rod, a lens draw tube movably mounted in said camera, and a gear train including a fixed fulcrum lever of which one arm is straight but offset, one end of said gear train being in mesh with said support rod gear rack, said gear train imparting a pivoting motion to said offset arm, and said lever through its other arm imparting to the lens draw tube motion modified substantially according to optical laws.

6. An automatic focusing camera comprising a light-tight casing, an arm for supporting the camera, a support rod, said arm being slidably securable along said support rod, a draw tube lens barrel slidably arranged on said camera, means for rotatably securing said camera on said arm, means for slidably adjusting said draw tube lens barrel and extending through the camera into said support arm along the axis of rotation of the camera, and means for automatically actuating said adjusting means upon movement of the arm along the support rod.

7. An automatic focusing camera comprising a light-tight casing, an arm for supporting the camera, a support rod, said arm being slidably securable along said support rod, a draw tube lens barrel on said camera, means for adjusting said draw tube lens barrel, a gear train extending through the said camera into said support arm and adapted to actuate said adjusting means, and means for automatically operating said gear train upon movement of the arm along said support rod.

8. An automatic focusing camera comprising a light-tight casing, an arm for supporting the camera, a support rod, said arm being slidably securable along said support rod, a draw tube lens barrel slidably arranged on said camera, a gear train and bell crank to said draw tube extending through said camera into said support arm, means for automatically operating said gear train and bell crank, one arm of said bell crank being pivotally connected with the draw tube lens barrel, and the other arm being adapted to be pivoted about the fulcrum of the bell crank by the train of gears.

RUPERT H. DRAEGER.
HAROLD F. BENNETT.